(12) United States Patent
Kirchner (10) Patent No.: US 8,258,746 B2
(45) Date of Patent: Sep. 4, 2012

(54) CHARGER AND CHARGING METHOD

(75) Inventor: Andreas Kirchner, Wallenhorst (DE)

(73) Assignee: General Electric Company, Schenectady, NY (US)

( * ) Notice: Subject to any disclaimer, the term of this patent is extended or adjusted under 35 U.S.C. 154(b) by 760 days.

(21) Appl. No.: 12/339,141

(22) Filed: Dec. 19, 2008

(65) Prior Publication Data

US 2010/0156348 A1 Jun. 24, 2010

(51) Int. Cl.
*H02J 7/00* (2006.01)
(52) U.S. Cl. .................................. 320/109; 320/107
(58) Field of Classification Search .............. 320/107, 320/109
See application file for complete search history.

(56) References Cited

U.S. PATENT DOCUMENTS

| | | | | |
|---|---|---|---|---|
| 5,625,275 A | * | 4/1997 | Tanikawa et al. | 320/160 |
| 2007/0080662 A1 | * | 4/2007 | Wu | 320/110 |
| 2009/0096416 A1 | * | 4/2009 | Tonegawa et al. | 320/109 |

* cited by examiner

*Primary Examiner* — Bot Ledynh
(74) *Attorney, Agent, or Firm* — Global Patent Operation; Douglas D. Zhang (57) ABSTRACT

A charger adapted for charging at least one energy storage device to be charged by means of an electrical charging power provided by an electrical power supply grid is provided. The charger includes a grid parameter detector unit adapted for detecting at least one electrical grid parameter of the electrical power supply grid and for outputting a grid parameter detection signal on the basis of the at least one detected electrical grid parameter. A control unit receives the grid parameter detection signal and determines a control signal, wherein a charging power adjustment unit adjusts the electrical charging power on the basis of the control signal.

18 Claims, 9 Drawing Sheets

CHARGER AND CHARGING METHOD

BACKGROUND

The present disclosure generally relates to a charger and a charging method for charging an energy storage device to be charged. In particular, the present disclosure relates to a charge control method for a controlled charging of at least one energy storage device to be charged and a charger for carrying out the charging method.

A charging method for charging an energy storage device to be charged may depend on the charging state of the energy storage device to be charged. It is thus possible to charge an energy storage device in dependence of an electrical parameter of the energy storage device to be charged, e.g. an electrical storage device parameter which may be measured during charging the energy storage device. The electrical parameter may be an energy storage device voltage measured at the connection terminals of the energy storage device, a charging current flowing into the energy storage device to be charged and an energy storage device temperature.

The energy storage device to be charged receives its charging power from a power supply arranged externally to the charger. An operation state of the external power supply may change during charging the energy storage device to be charged by means of the charger.

SUMMARY

In view of the above, a charger adapted for charging at least one energy storage device to be charged by means of an electrical charging power provided by an electrical power supply grid is provided, the charger including a grid parameter detector unit adapted for detecting at least one electrical grid parameter of the electrical power supply grid and for outputting a grid parameter detection signal on the basis of the at least one detected electrical grid parameter, a control unit adapted for receiving the grid parameter detection signal and for determining a control signal on the basis of the received grid parameter detection signal and a charging power adjustment unit adapted for receiving the control signal and being adapted for adjusting the electrical charging power on the basis of the control signal.

According to another aspect an electrically powered car including a charger and an energy storage device to be charged is provided, the charger including a grid parameter detector unit adapted for detecting at least one electrical grid parameter of the electrical power supply grid and for outputting a grid parameter detection signal on the basis of the at least one detected electrical grid parameter a control unit adapted for receiving the grid parameter detection signal and for determining a control signal on the basis of the received grid parameter detection signal, and a charging power adjustment unit adapted for receiving the control signal and being adapted for adjusting the electrical charging power on the basis of the control signal.

According to yet another aspect a method for charging at least one energy storage device to be charged by means of an electrical power supply grid is provided, the method including the steps of providing an electrical charging power by means of the electrical power supply grid, receiving at least one electrical grid parameter of the electrical power supply grid, determining a control signal on the basis of the received electrical grid parameter, and adjusting the electrical charging power for the energy storage device to be charged on the basis of the control signal.

Further exemplary embodiments are according to the dependent claims, the description and the accompanying drawings.

DRAWINGS

A full and enabling disclosure, including the best mode thereof, to one of ordinary skill in the art is set forth more particularly in the remainder of the specification including reference to the accompanying drawings wherein.

DETAILED DESCRIPTION

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

Figure 1:
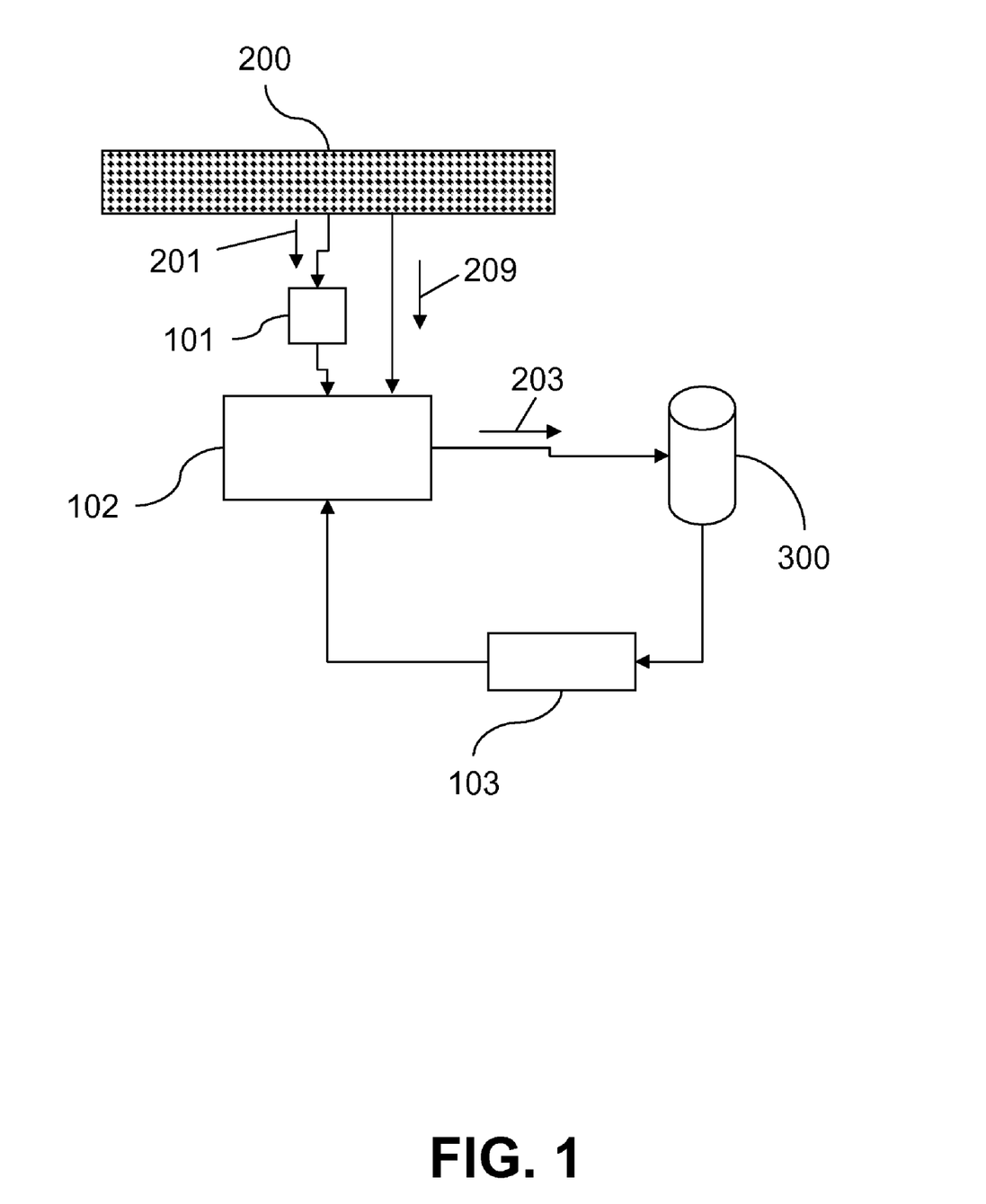
FIG. 1 shows a schematic block diagram of a set-up of a charger according to a typical embodiment.

FIG. 1 is a schematic diagram of a charger 100 for charging an energy storage device 300 to be charged. The energy storage device 300 may be is at least one of a battery, a capacitor, a fuel cell, and an ultraCap. FIG. 1 shows the principle operation of a charger 200 according to a typical embodiment including a grid parameter detection unit 101 which is provided for detecting at least one electrical parameter of an electrical power supply grid 200 which is used as a power supply source for charging the energy storage device 300. The electrical power supply grid 200 may be, but is not restricted to, an electricity network, a main power supply, a national grid or any other power supply system.

For the understanding of the present disclosure, it is only necessary that a grid connection can be provided which is used for a transfer of an electrical charging power 209 to a charging power adjustment unit 102 which then adjusts the electrical charging power in accordance with predeterminable parameters such that an efficient charging of the energy storage device 300 to be charged can be obtained.

The charging power adjustment unit 102 then provides a controlled electrical charging power 203 for the energy storage device 300. Storage device parameters such as energy storage device voltage, charging current and energy storage device temperature may be measured by a storage device parameter detector unit 103, the output signal of which is provided for the charging power adjustment unit 102 in order to provide an appropriate charging power adjustment.

The electrical power supply grid 200 thus on the one hand provides electrical power in the form of an electrical charging power 209 which is adjusted by the charging power adjustment unit, and on the other hand information about parameters of the electrical power supply grid 200 which are detected by the grid parameter detection unit 101.

According to a typical embodiment, the electrical power supply grid 200 may be a national grid, and the at least one energy storage device 300 to be charged may be a battery of a vehicle having an electric driving system such as an electrically powered car. The following is an example calculation which is based on the assumption that, at a specific moment in time, a percentage of electrically powered cars amounts to 5%.

Assuming, moreover, that an average power consumption of an electrically powered car is approximately 10 kW when the energy storage device of the electrically powered car has to be charged, and the charging time is 2 hours, then the energy which has to be provided is calculated according to the following formula:

10 kW·2 h=20 kWh.

Furthermore, if a charge/discharge efficiency of 80% is provided and three phases of a 230 VAC voltage L/N grid are used wherein the current per phase amounts to 10 A, then the charging power which is required to charge the energy storage device 300 of the electrically powered car amounts to 6.90 kW. A charging time may then be determined according to the following formula:

20 kWh:6.90 kW:0.8=3.62 h

Thus, the overall charging time assuming a charging/discharging efficiency of 80% amounts to 3.62 hours.

In January 2008, approximately 40,000,000 cars have been licensed such that an assumed percentage of 5 for electrical powered cars amounts to a peak load for the electrical power grid to 40,000,000·0.05·6.90 kW=13.8 GW Thus a total charge energy of approximately 50,000 MWh has to be provided assuming that the batteries to be charged of the electrically powered cars are charged at the same time.

Current national electricity grids available in Germany would not be able to cope with such an amount of charge energy. Thus, the charging of large batteries such as the batteries used in electrically powered cars may be charged in dependence of grid parameters which are detected by the grid parameter detector unit 101. The grid parameters may include, but are not restricted to a grid frequency, a grid voltage and a grid current. In order to provide a stable electrical grid operation, the fed-in power should be equal to the load power, according to the following equation (1):

$$P_{feed\text{-}in} = P_{load} \tag{1}$$

wherein $P_{feed\text{-}in}$ is the feed-in power provided by the electrical power supply grid, and $P_{load}$ is a load power which is required to charge the at least one energy storage device 300 to be charged. Energy conversion in power plants is provided by generators having rotating masses. The rotation frequency determines the grid frequency. The mechanical power provided for the generator may be calculated according to the following equation (2):

$$P_{mech} = M \cdot 2 \cdot \pi \cdot n \tag{2}$$

wherein M is a torque at the generator axis and n denotes the rotation per second of the generator axis. The electrical power at the output terminal of the generator amounts to $P_{el}$ in accordance with the following equation (3):

$$P_{el} = U \cdot I \tag{3}$$

Thus, the grid frequency is dependent on the rotational frequency of the generator and is the same at all locations within the electrical power supply grid which are connected to the generator. The grid voltage depends from the induced voltage at the generator and voltage drops in the power transmission lines. The induced voltage is according to the following equation (4):

$$dU = \frac{d\Phi}{dt} \tag{4}$$

wherein $d\Phi$ is a magnetic flux change. If high loads, e.g. for charging batteries to be charged, are connected to the electrical power supply grid 200, the mechanical power in accordance with equation (2) cannot be provided such that a rotational frequency of the generator decreases resulting in a decrease of the grid frequency.

In the year 2007, the maximum generator power in Germany amounted to about 130 Gw wherein the average energy conversion amounted to approximately 75 GW. Grid frequency modifications within 1% are tolerable, wherein grid frequency fluctuations of more than 2% lead to necessary corrections. The load of 13.8 GW evaluated above is thus a load contribution for the electrical power supply grid 200 which cannot be neglected.

The typical embodiment of a charger 100, the principle set-up of which is shown in FIG. 1, thus takes into account the fluctuation of electrical grid parameters 201. For example, if the grid frequency at the electrical grid parameter is measured, if the electrical power supply grid is overloaded, the grid frequency will decrease.

The charger 100 now may reduce the charging power for charging the energy storage device 300 to be charged. The charger will receive less power from the electrical power supply grid such that the grid becomes stable thus that equation (1) mentioned above is fulfilled. On the other hand, if the electrical power supply grid 200 is under-loaded, then the grid frequency will increase.

Then the charger will be used in normal operation with a normal grid frequency. If the grid frequency increases, the charger will increase the charging power for the energy storage device 300 to be charged. The charger will thus receive more power from the electrical power supply grid 200 until then, when the grid becomes unstable. The charger 100 according to the typical embodiment shown in FIG. 1 thus has a means for providing a grid stability even if high charging power is required.

Figure 2:
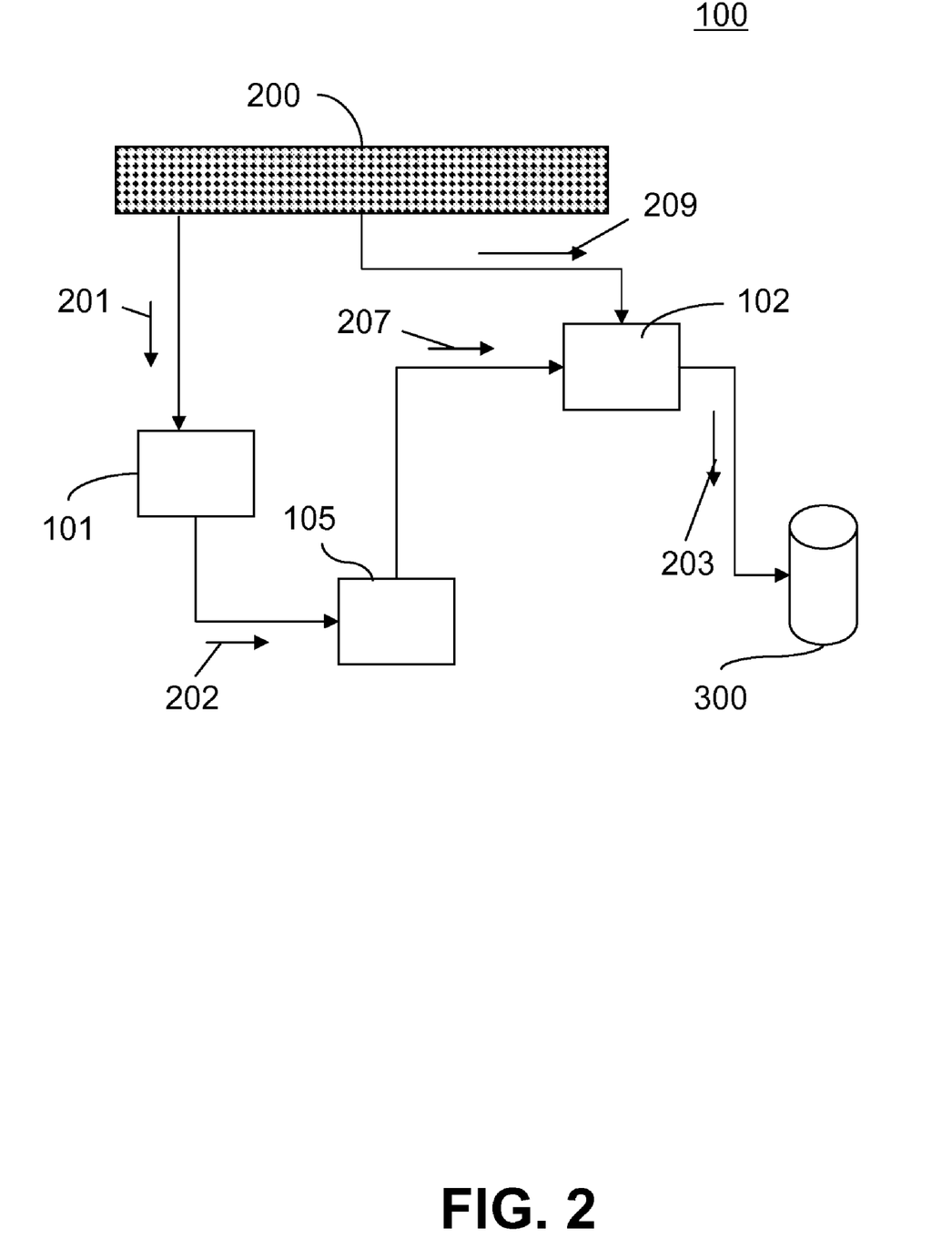
FIG. 2 is a more detailed block diagram of a charger for charging an energy storage device to be charged having a control unit for controlling the charging operation conditions of the charger, according to another typical embodiment.

FIG. 2 is a schematic block diagram of a charger 100 in a more detailed illustration. As shown in FIG. 2, the electrical power supply grid 200 is provided as a power supply means for the charging power of the energy storage device to be charged 300. To this end, the charging power in the form of an electrical charging power 209 is provided to a charging power adjustment unit 102. Furthermore, at least one electrical grid parameter 201 is detected by means of grid parameter detection unit 101.

The at least one electrical grid parameter 201 may be at least one of a grid frequency, a grid voltage and a grid current. The grid parameter detection unit 101 is adapted for outputting a grid parameter detection signal 202 on the basis of the at least one electrical grid parameter detected from the electrical power supply grid.

Furthermore, a control unit 105 is provided which is adapted to control the charging power adjustment unit 102 by means of a control signal 207 which is determined on the basis of the grid parameter detection signal 202. The controlling of the charging power adjustment unit 102 by means of the control signal 207 may be provided on the basis of frequency charge curves and/or voltage charge curves as will be described herein below with respect to FIGS. 6 and 7.

The controlling of the charging power adjustment unit 102 by means of the control signal 207 results in a modified electrical charging power, i.e. the controlled electrical charging power 203, the magnitude of which is controlled on the basis of the detected at least one electrical grid parameter 201. Thus it is possible to charge a large number of batteries 300 to be charged under different operation conditions of the electrical power supply grid 200.

Figure 3:
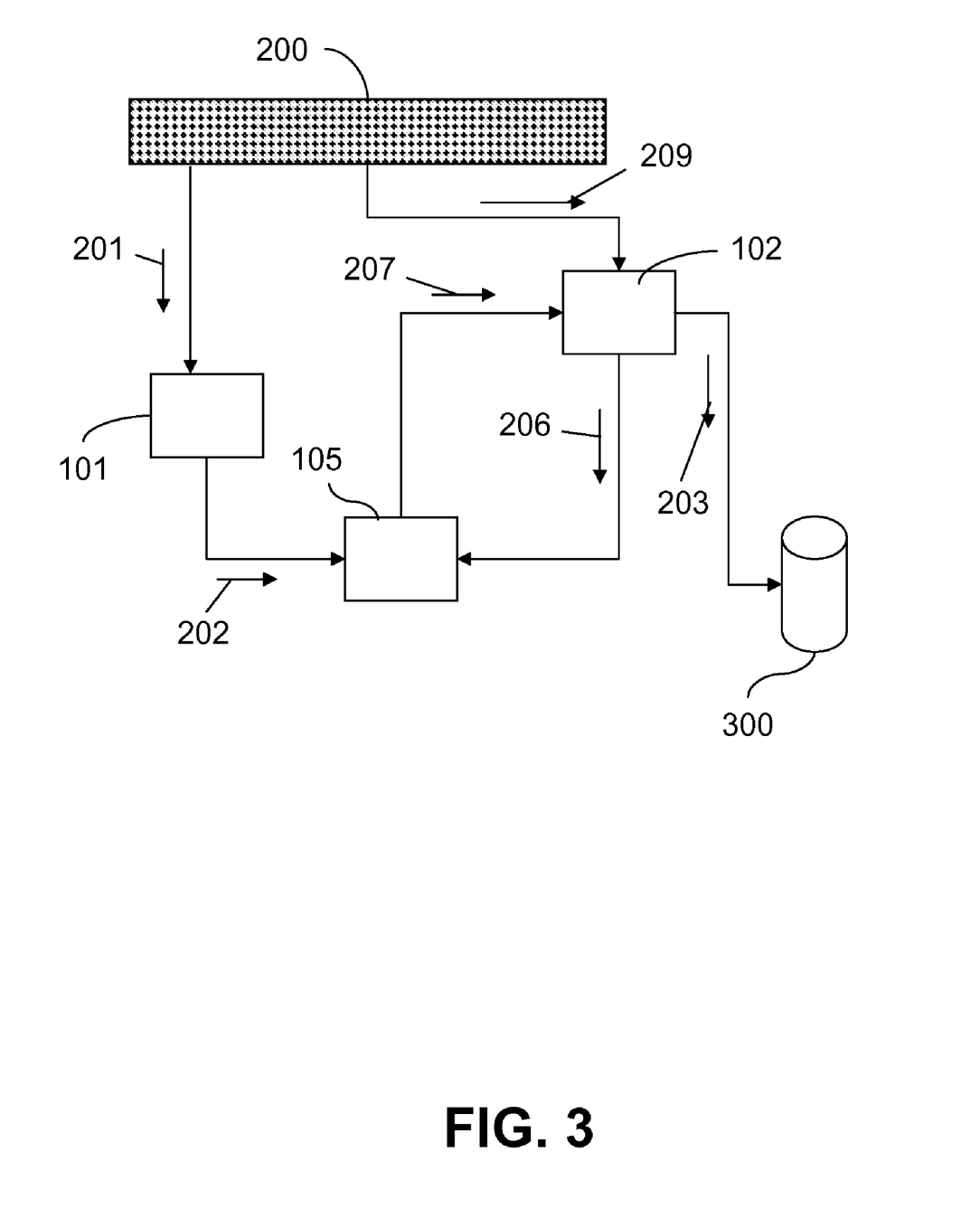
FIG. 3 is a detailed block diagram of a charger for charging an energy storage device to be charged having a control unit which can monitor a charging power adjustment unit, according to yet another typical embodiment.

FIG. 3 is a detailed block diagram of another charger 100 according to yet another typical embodiment. Compared to the charger 100 shown in FIG. 2, the charger shown in FIG. 3 furthermore has a feedback line from the charging power adjustment unit 102 to the control unit 105. Via this feedback line, a status signal 206 indicating a status of the charging power adjustment unit 102 may be provided for the control unit 105.

Thus, the control signal 207 for controlling the charging power adjustment unit 102 may be determined on the basis of the grid parameter detection signal 202 on the one hand and the status signal 206 indicating the status of the charging power adjustment unit 102 on the other hand. The controlled electrical charging power 203 is thus adjusted by means of the charging power adjustment unit 102 in dependence of the status signal 206 and the grid parameter detection signal 202.

It is noted here that components which are included in the charger 100 according to FIG. 3 and which correspond to the components already described with respect to FIG. 2 are not detailed here in order to avoid a redundant description.

Figure 4:
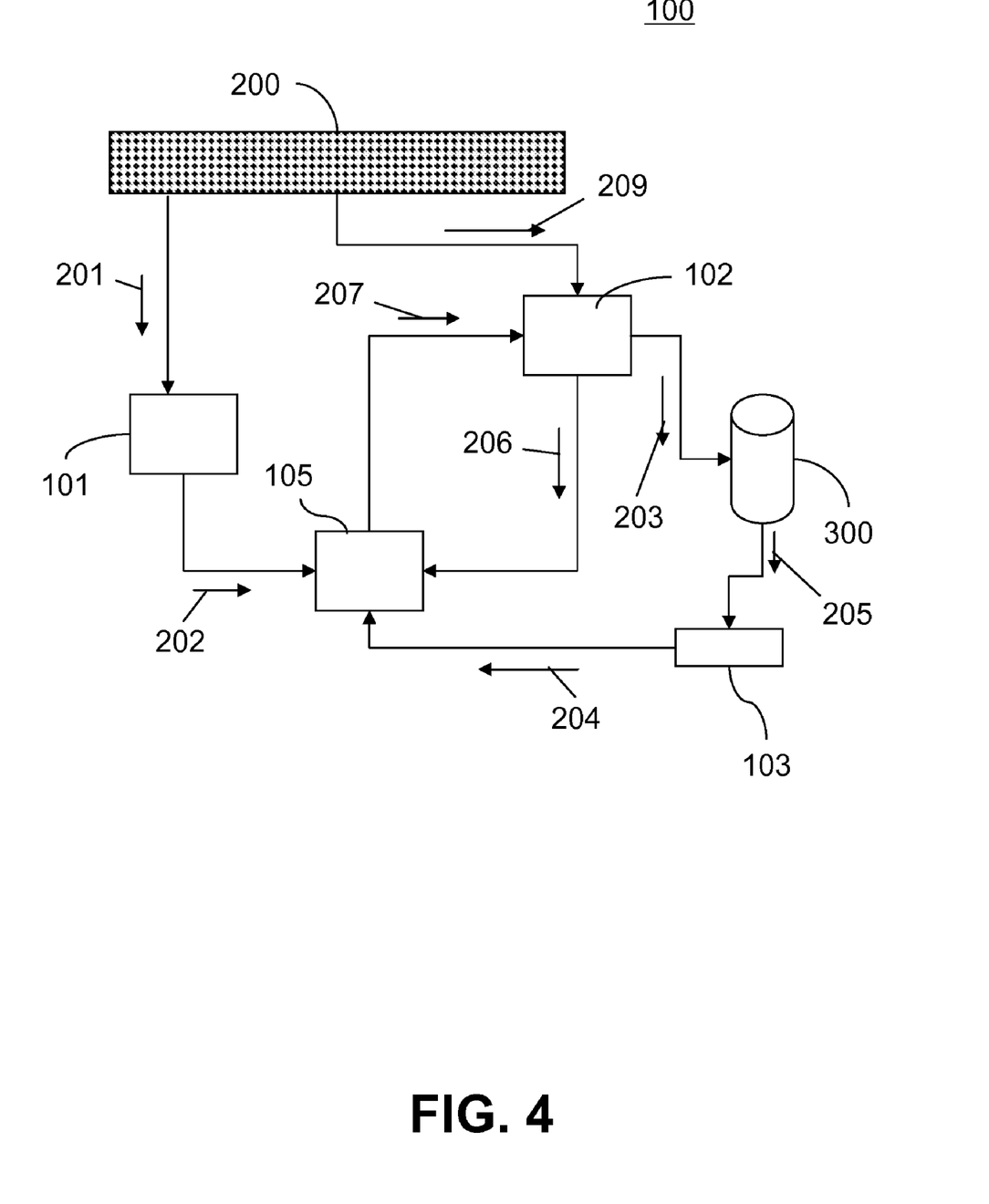
FIG. 4 is a detailed block diagram of a charger for charging an energy storage device to be charged having a control unit which provides a charging operation condition on the basis of at least one grid parameter detection signal and at least one storage device parameter detection signal, according to yet another typical embodiment.

FIG. 4 is a detailed block diagram of a charger 100 according to yet another preferred embodiment. In addition to the set-up shown in FIG. 3, the set-up of the charger 100 according to FIG. 4 furthermore includes a storage device parameter detector unit 103 which is adapted for detecting at least one storage device parameter 205 derived from the energy storage device 300 to be charged. The at least one storage device parameter 205 of the energy storage device 300 to be charged is at least one of an energy storage device voltage, an energy storage device current and an energy storage device temperature.

The storage device parameter detector unit 103 provides a storage device parameter detection signal on the basis of the storage device parameter 205 of the energy storage device 300. The storage device parameter detection signal is provided for the control unit 105 for determining the control signal 207 on the basis of the at least one of the grid parameter detection signal 202 and the storage device parameter detection signal 204, wherein the control signal 207 is adapted for controlling the charging power adjustment unit 102.

Specifically, the control signal 207 in the set-up of the charger 100 according to FIG. 4 is determined on the basis of the grid parameter detection signal 202, the status signal 206 of the charging power adjustment unit 102 and the storage device parameter detection signal 204. In order to avoid a redundant description, the remaining components shown in FIG. 4 are not detailed here, because these components correspond to the respective components shown in FIGS. 2 and/or 3.

Figure 5:
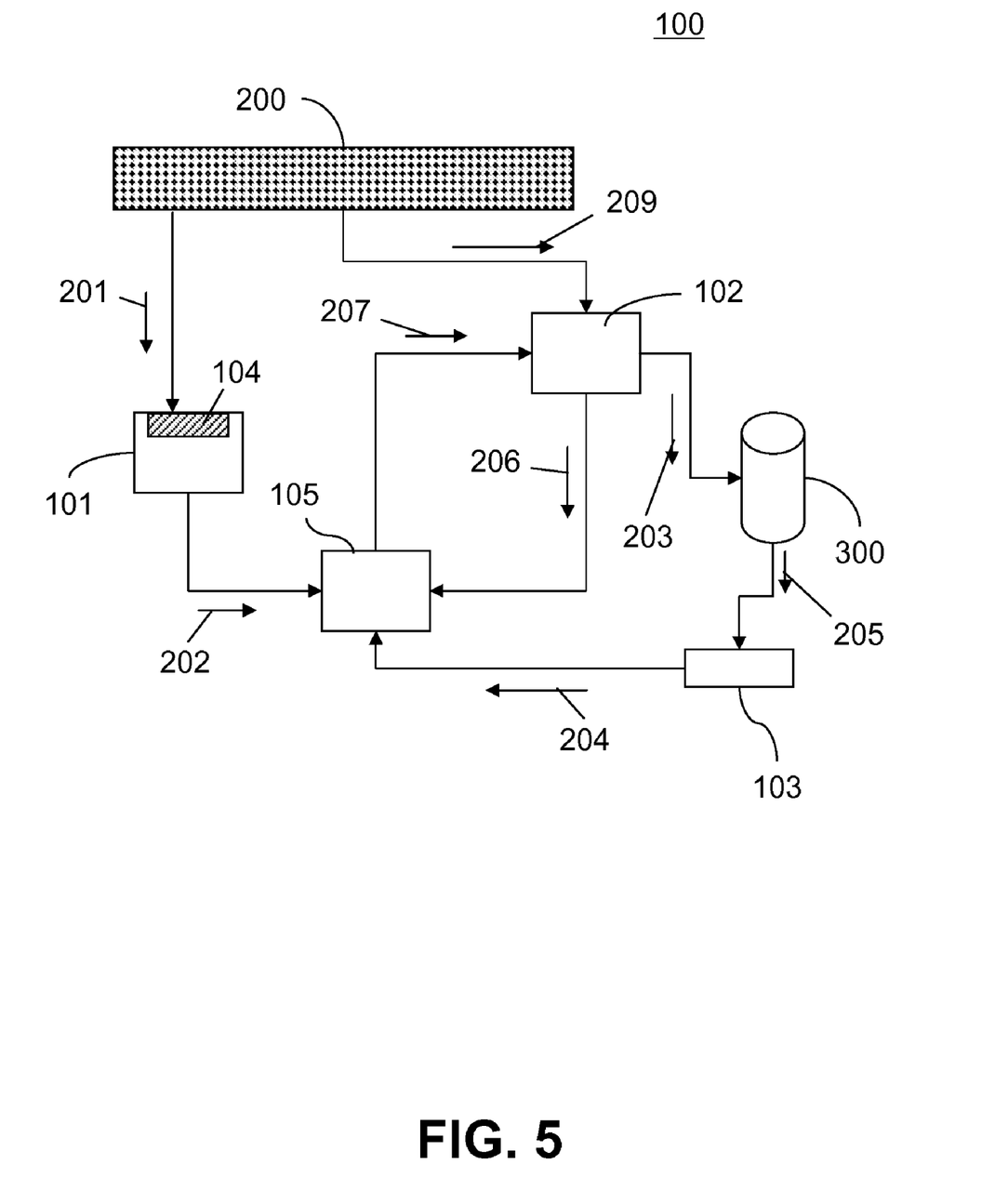
FIG. 5 is a detailed block diagram of a charger for charging an energy storage device to be charged having a filter unit for filtering an electrical grid parameter signal, according to yet another typical embodiment.

FIG. 5 is another detailed block diagram of a charger 100 according to yet another preferred embodiment. Compared to the charger 100 shown in FIG. 4, the charger 100 shown in FIG. 5 furthermore includes a filter unit 104. The filter unit 104 typically is designed as a low-pass filter having a cut-off frequency of typically 400 Hz.

In a typical embodiment shown in FIG. 5, the filter unit 104 is provided as an integral part of the grid parameter detector unit 101. Thus, it is possible to filter the signal of the electrical grid parameter 201 which is provided by the electrical power supply grid 200. Such kind of filtering provides a more accurate detection of the electrical grid parameters, more typically the detection of the grid frequencies is facilitated due to this low-pass filtering.

It is noted again that, in order to avoid a redundant description, components shown in FIG. 5 which correspond to components shown in previous figures are not detailed here.

Figure 6:
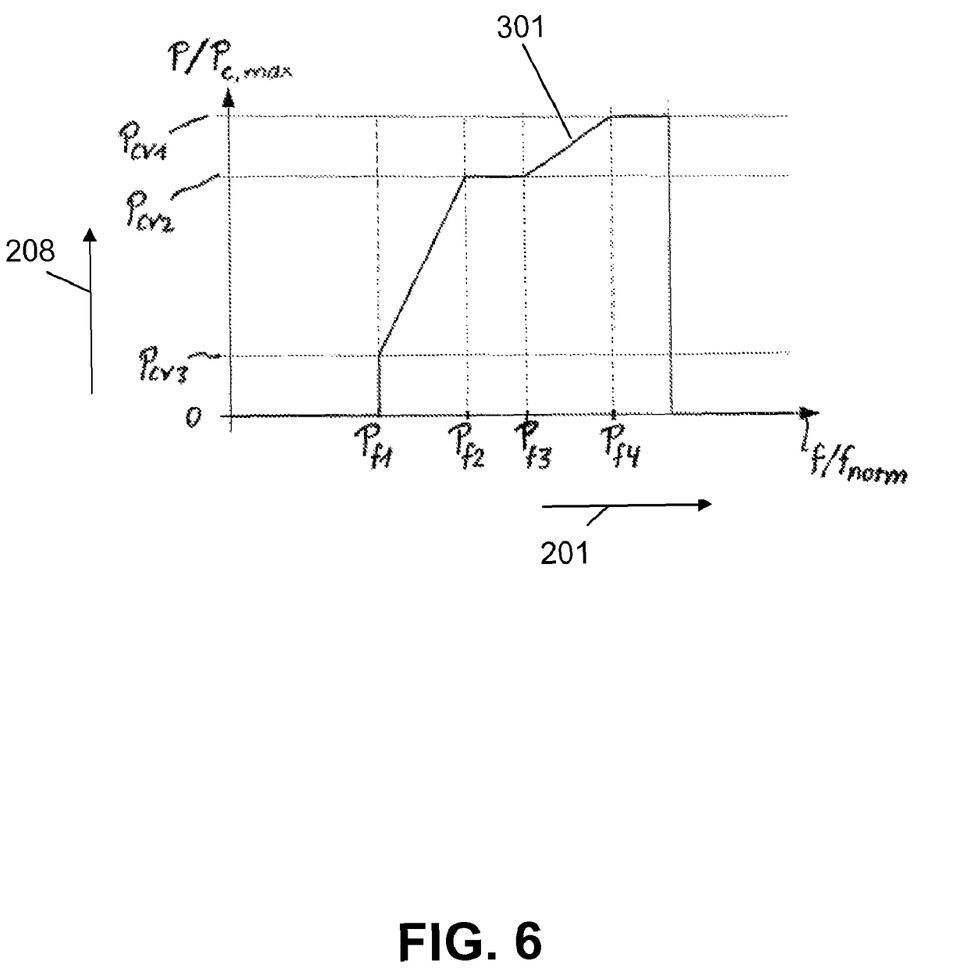
FIG. 6 is a diagram showing a relative charging power on the basis of an electrical grid parameter, wherein the electrical grid parameter is a grid frequency, such that a frequency charge curve is provided.

FIG. 6 is a diagram showing a frequency charge curve 301. The frequency charge curve is shown in a diagram which relates a relative charge power 208 to at least one electrical grid parameter 201. In the case shown in FIG. 6, the at least one electrical grid parameter 201 is a grid frequency. The frequency is related to a normalized frequency $f_{norm}$, wherein the relative charge power is normalized to a maximum charge power $P_{Cmax}$. The characteristic of the frequency charge curve 301 is determined by different segments.

Figure 7:
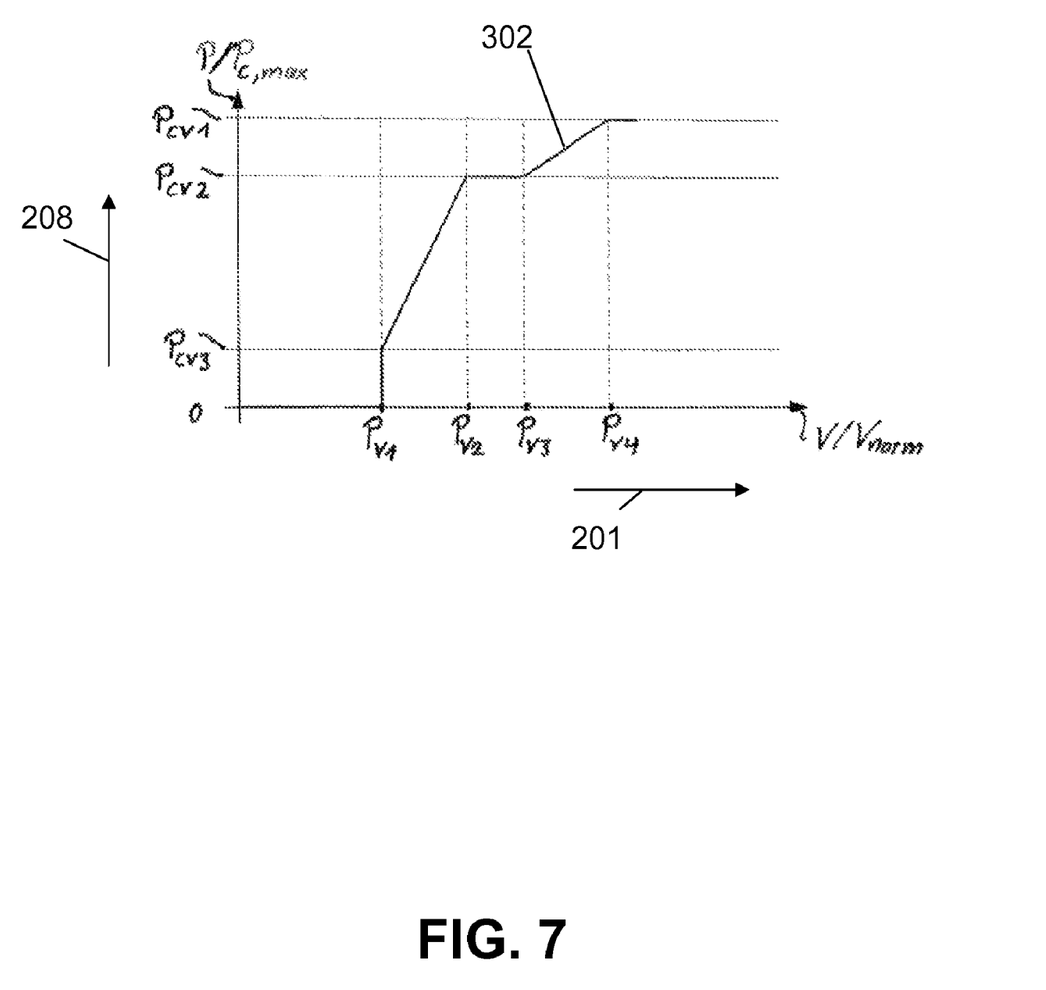
FIG. 7 is a diagram showing a voltage charge curve in the form of a relative charging power on the basis of an electrical grid parameter, wherein the electrical grid parameter is a grid voltage.

Four different threshold values of the grid parameter, indicated as Pf1, Pf2, Pf3 and Pf4 in FIG. 6, and as Pv1, Pv2, Pv3 and Pv4 in FIG. 7, may be provided.

A range between $P_{f2}$ and $P_{f3}$ indicates normal operation, i.e. the grid frequency variation is in the range of ±1% (0.99 to 1.01 times the normal frequency). The range between $P_{f1}$ and $P_{f4}$ indicates a ±4% range, wherein in the lower range the charging power has to be decreased from a charging power of 80% at $P_{cf2}$ to 20% at $P_{cf3}$ or, in the right part of the diagram, can be increased from 80% at $P_{cf2}$ to 100% at $P_{cf1}$. The grid frequency variations outside of the ±4% variation result in a switching-off of the charging power according to the typical embodiment described with respect to FIG. 6.

Using the frequency charge curve 301 shown in FIG. 6, it is thus possible to adapt the charging conditions of an energy storage device 300 to be charged to the condition of the electrical power supply grid 200 by means of a detection of at least one electrical grid parameter.

FIG. 7 is a diagram showing a voltage charge curve 302 for controlling the charging process on the basis of a grid voltage provided by the electrical power supply grid 200. As shown in FIG. 7, the voltage charge curve 302 is drawn as a relative charge power 208 as a function of an electrical grid parameter 201 which in this case is a grid voltage V is related to a normalized grid voltage $V_{norm}$ such that, in accordance with the situation shown in FIG. 6 for the frequency charge curve 301, a range $P_{V2}$ and $P_{V3}$ is a ±1% region where a charging is performed at 80% of the maximum charge power $P_{Cmax}$.

In the region between −4% and −1%, i.e. in the region between $P_{V1}$ and $P_{V2}$, the charge power is decreased from $P_{CV2}$ to $P_{CV3}$, i.e. from 80% to 20% of $P_{Cmax}$ such that the load applied at the electrical power supply grid 200 is reduced. More than −4% deviation from the normalized grid voltage results in a switch-off of the charging process.

On the other hand, if the voltage provided by the grid is increased by more than 1%, i.e. in the region between $P_{V3}$ and $P_{V4}$, the charging power is increased from 80% at $P_{CV2}$ to 100% at $P_{CV1}$. Furthermore, it is possible that the charging power remains at 100% at $P_{CV1}$, if the grid voltage increases even more above $P_{V4}$.

It is noted here that the charging power adjustment unit 102 may be controlled by a control signal 207 which is determined on the basis of the frequency charge curve 301 alone, the voltage charge curve 302 alone or a combination of the frequency charge curve and the voltage charge curve. The charging power $P_{CV2}$ is referred to as the nominal charging power.

Figure 8:
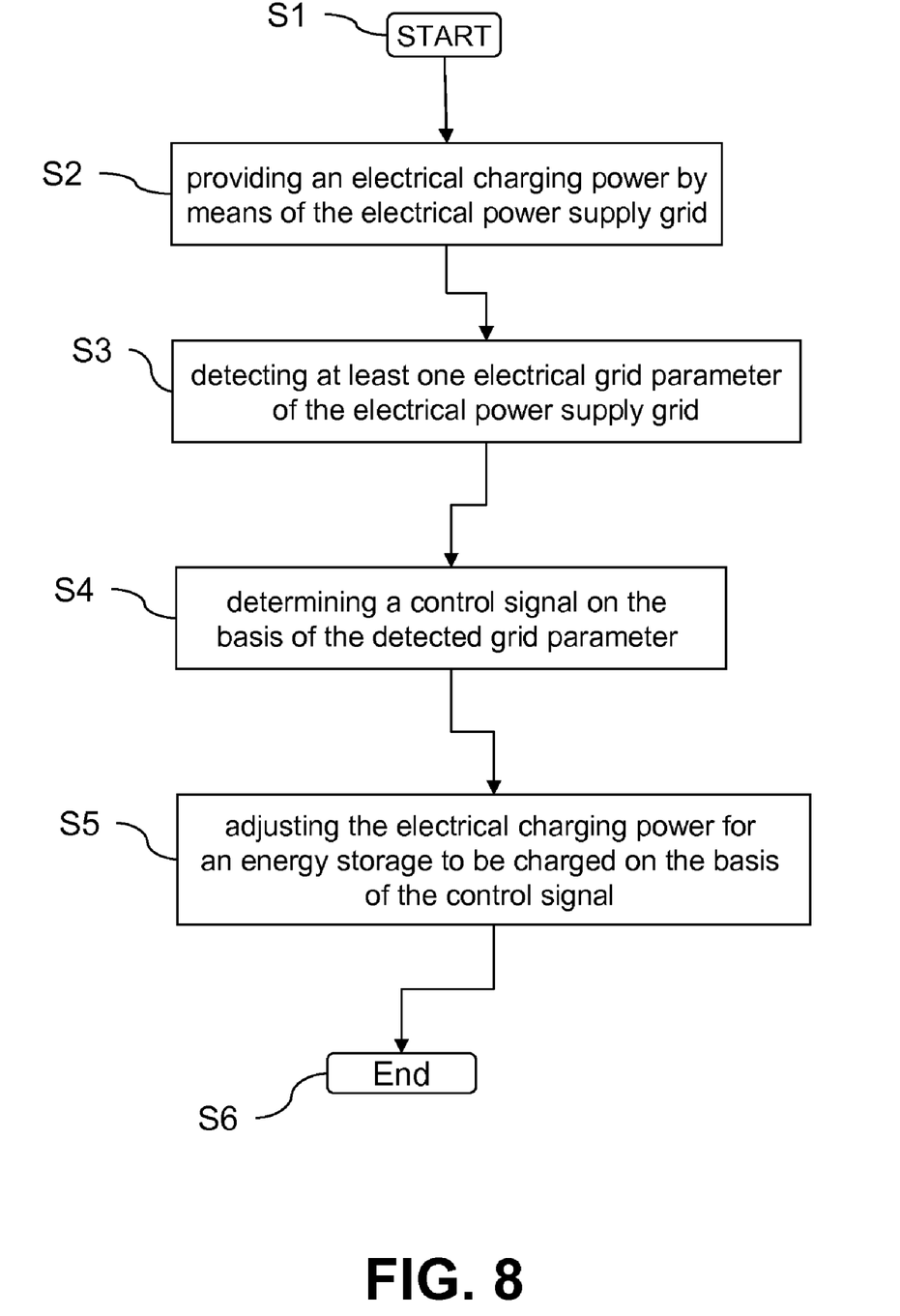
FIG. 8 is a flowchart of a charging method for charging an energy storage device to be charged.

FIG. 8 is a flowchart of a method for charging at least one energy storage device to be charged by means of an electrical power supply grid.

The procedure starts at a step S1. Then, at a step S2, an electrical charging power is provided by means of the electrical power supply grid. The procedure advances to a step S3 where at least one electrical grid parameter of the electrical power supply grid is detected. The at least one electrical grid parameter of the electrical power supply grid may be at least one of the grid voltage, a grid current and a grid frequency.

The procedure advances to a step S4 where a control signal is determined on the basis of the detected grid parameter. The control signal may then be used to control the charging power adjustment unit 102 described herein above with respect to FIGS. 1 to 5. At a step S5, the electrical charging power for the energy storage device to be charged is adjusted on the basis of the control signal. At a step S6, the procedure is ended.

Figure 9:
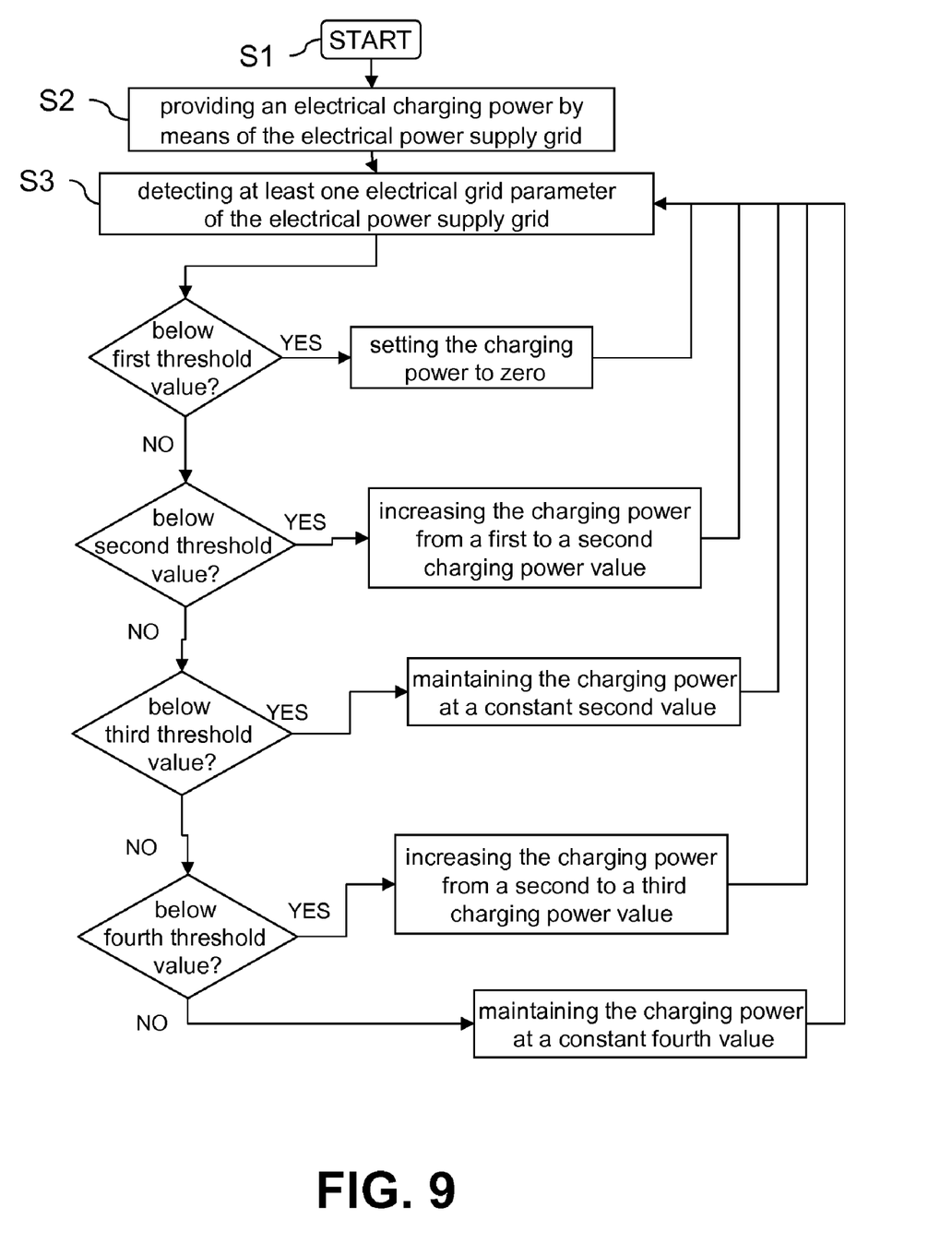
FIG. 9 is a flowchart of a charging method for charging an energy storage device to be charged illustrating details of the charging power adjustment.

FIG. 9 is a flowchart of a charging method for charging an energy storage device to be charged illustrating details of the charging power adjustment.

The steps S1 and S2 correspond to the steps S1 and S2 described herein above with respect to FIG. 8. After step S2 the electrical charging power is determined with respect to four threshold values of the grid parameter, indicated as Pf1, Pf2, Pf3 and Pf4 in FIG. 6, and as Pv1, Pv2, Pv3 and Pv4 in FIG. 7.

The electrical charging power is set to zero when the electrical grid parameter is below a first threshold value. Then the procedure returns to step S3 where at least one electrical grid parameter of the electrical power supply grid is detected.

The electrical charging power is increased from a first electrical charging power, Pcv3 in FIGS. 6 and 7, to a second electrical charging power, Pcv2 in FIGS. 6 and 7, when the electrical grid parameter above the first threshold value and below a second threshold value larger than the first threshold value. Then the procedure returns to step S3 where at least one electrical grid parameter of the electrical power supply grid is detected.

Furthermore the electrical charging power is kept at a constant value when the electrical grid parameter is above the second threshold value and below a third threshold value larger than the second threshold value. Then the procedure returns to step S3 where at least one electrical grid parameter of the electrical power supply grid is detected.

The electrical charging power is increased from the second electrical charging power to a third electrical charging power, Pcv2 in FIGS. 6 and 7, when the electrical grid parameter is above the third threshold value and below a fourth threshold value larger than the third threshold value. Then the procedure returns to step S3 where at least one electrical grid parameter of the electrical power supply grid is detected.

Finally the electrical charging power is kept at a constant value when the electrical grid parameter is above the fourth threshold value. Typically the third threshold value is larger than the second threshold value. Moreover the increase in electrical charging power may be according to a linear function. Then the procedure returns to step S3 where at least one electrical grid parameter of the electrical power supply grid is detected.

The at least one energy storage device to be charged is charged in accordance with at least one pre-determined charge curve. The at least one pre-determined charge curve prescribes a charging voltage variation. Furthermore, the at least one pre-determined charge curve prescribes a charging frequency variation. In addition to that, the at least one pre-determined charge curve may prescribe a combination of a charging voltage variation and a charging frequency variation.

The invention has been described on the basis of embodiments which are shown in the appended drawings and from which further advantages and modifications emerge. However, the disclosure is not restricted to the embodiments described in concrete terms, but rather can be modified and varied in a suitable manner. It lies within the scope to combine individual features and combinations of features of one embodiment with features and combinations of features of another embodiment in a suitable manner in order to arrive at further embodiments.

It will be apparent to those skilled in the art, based upon the teachings herein, that changes and modifications may be made without departing from the disclosure and its broader aspects. That is, all examples set forth herein above are intended to be exemplary and non-limiting.

The invention claimed is:

1. A charger configured to charge at least one energy storage device to be charged by means of an electrical charging power provided by an electrical power supply grid, the charger comprising:
    a grid parameter detector unit configured to detect at least one electrical grid parameter of the electrical power supply grid and for outputting a grid parameter detection signal on the basis of the at least one detected electrical grid parameter;
    a control unit configured to receive the grid parameter detection signal and to determine a control signal on the basis of the received grid parameter detection signal; and
    a charging power adjustment unit configured to receive the control signal and being configured to adjust the electrical charging power on the basis of the control signal, wherein the electrical charging power is increased from a first electrical charging power value to a second electrical charging power value when the at least one electrical grid parameter is above a first threshold value and below a second threshold value larger than the first threshold value.

2. The charger in accordance with claim 1, wherein the at least one electrical grid parameter of the electrical power supply grid is at least one of a grid frequency, a grid voltage and a grid current.

3. The charger in accordance with claim 1, wherein the electrical charging power is set to zero when the at least one electrical grid parameter is below the first threshold value.

4. The charger in accordance with claim 1, wherein the electrical charging power is kept at a constant value when the at least one electrical grid parameter is above the second threshold value and below a third threshold value larger than the second threshold value.

5. The charger in accordance with claim 4, wherein the electrical charging power is increased from the second electrical charging power value to a third electrical charging power value when the at least one electrical grid parameter is above the third threshold value and below a fourth threshold value larger than the third threshold value.

6. The charger in accordance with claim 5, wherein the electrical charging power is kept at a constant value when the at least one electrical grid parameter is above the fourth threshold value.

7. The charger in accordance with claim 5, wherein the third threshold value is larger than the second threshold value.

8. The charger in accordance with claim 1, wherein the increase in the electrical charging power is according to a linear function.

9. The charger in accordance with claim 5, wherein the first, second, third and fourth threshold values are at least one of grid voltages and grid frequencies.

10. The charger in accordance with claim 1, wherein the energy storage device is at least one of a battery, a capacitor, a fuel cell, and an ultraCap.

11. The charger in accordance with claim 1, wherein a storage device parameter detector unit is provided which is configured to detect at least one storage device parameter which is provided for the control unit for determining the control signal on the basis of at least one of the grid parameter detection signal and a storage device parameter detection signal, the control signal being configured to control the charging power adjustment unit.

12. The charger in accordance with claim 11, wherein at least one of the grid parameter detector unit and the storage device parameter detector unit is formed as an integral part of the at least one energy storage device to be charged.

13. The charger in accordance with claim 11, wherein the at least one storage device parameter of the at least one energy storage device to be charged is at least one of an energy storage device voltage, an energy storage device current, and an energy storage device temperature.

14. An electrically powered car comprising a charger and an energy storage device to be charged, the charger comprising:
a grid parameter detector unit configured to detect at least one electrical grid parameter of an electrical power supply grid and to output a grid parameter detection signal on the basis of the at least one detected electrical grid parameter;
a control unit configured to receive the grid parameter detection signal and to determine a control signal on the basis of the received grid parameter detection signal; and
a charging power adjustment unit configured to receive the control signal and being configured to adjust an electrical charging power on the basis of the control signal, wherein the electrical charging power is increased from a first electrical charging power value to a second electrical charging power value when the at least one electrical grid parameter is above a first threshold value and below a second threshold value larger than the first threshold value.

15. The electrically powered car in accordance with claim 14, wherein the at least one electrical grid parameter of the electrical power supply grid is at least one of a grid frequency, a grid voltage and a grid current.

16. The electrically powered car in accordance with claim 14, wherein a storage device parameter detector unit is provided which is configured to detect at least one storage device parameter which is provided for the control unit configured to determine the control signal on the basis of at least one of the grid parameter detection signal and a storage device parameter detection signal, the control signal being configured to control the charging power adjustment unit.

17. The electrically powered car in accordance with claim 16, wherein at least one of the grid parameter detector unit and the storage device parameter detector unit is formed as an integral part of the energy storage device to be charged.

18. The electrically powered car in accordance with claim 16, wherein the at least one storage device parameter of the energy storage device to be charged is at least one of an energy storage device voltage, an energy storage device current and an energy storage device temperature.

* * * * *